United States Patent [19]

Hofstetter

[11] Patent Number: 4,495,574
[45] Date of Patent: Jan. 22, 1985

[54] BIDIRECTIONAL MULTI-MODE DATA TRANSFER BUS SYSTEM

[75] Inventor: Matthias Hofstetter, Flawil, Switzerland

[73] Assignee: Siemens-Albis AG, Zurich, Switzerland

[21] Appl. No.: 391,705

[22] Filed: Jun. 24, 1982

[30] Foreign Application Priority Data

Jul. 10, 1981 [CH] Switzerland ............... 4529/81

[51] Int. Cl.³ ................ G06F 3/04; G06F 5/04
[52] U.S. Cl. .................. 364/200; 179/18 ES; 179/99 R
[58] Field of Search ... 364/200 MS File, 900 MS File; 179/18 EE, 18 ES, 99 R, 2 DP, 18 FC

[56] References Cited

U.S. PATENT DOCUMENTS

| | | | |
|---|---|---|---|
| 3,633,169 | 1/1972 | Bickford | 364/200 |
| 4,047,159 | 9/1977 | Boundry | . |
| 4,075,691 | 2/1978 | Davis et al. | 364/200 |
| 4,230,913 | 10/1980 | Brothers et al. | 179/18 FC |
| 4,292,465 | 9/1981 | Wilson et al. | 178/3 |
| 4,319,338 | 3/1982 | Grudowski et al. | . |
| 4,442,504 | 4/1984 | Dummermuth et al. | 364/900 |
| 4,456,793 | 6/1984 | Baker et al. | 179/99 R |

*Primary Examiner*—James D. Thomas
*Assistant Examiner*—Archie E. Williams, Jr.
*Attorney, Agent, or Firm*—Werner W. Kleeman

[57] ABSTRACT

A data exchange system permits data transfers where both the length of the data words, and the speed of change of the information represented by the data, can both vary considerably. A central station is connected to an interface circuit, which in turn is radially connected by four-wire conductors or lines to a number of sub-units. Each sub-unit is in turn connected by a bus to a number of modules or sub-assemblies. The interface circuit contains a microcomputer and a coupler circuit. Each sub-unit contains a switching stage, a control logic circuit, and a number of shift registers.

10 Claims, 5 Drawing Figures

BIDIRECTIONAL MULTI-MODE DATA TRANSFER BUS SYSTEM

BACKGROUND OF THE INVENTION

The present invention relates to a new and improved construction of a bus system for the exchange of data between a central station or location and at least two modules or sub-assemblies.

SUMMARY OF THE INVENTION

It is a primary object of the present invention to provide an improved construction of bus system which is quite simple in construction and design and ensures for extreme reliability during the transmission of data, and wherein the length of the data words as well as the speed of change of the information represented by the data can both vary considerably.

Now in order to implement this object and others which will become more readily apparent as the description proceeds, the bus system of the present development is manifested by the features that an interface circuit connected with the central station contains a microcomputer and a coupler circuit. The exchange or transfer of data between the microcomputer and the coupler circuit in the one direction is accomplished by means of a parallel-serial converter and in the other direction by means of a serial-parallel converter. The coupler circuit is connected by means of separate signal transfer lines in each case with a respective reversing or switching stage provided in a sub-unit. The switching stage controls via a control logic circuit a status word generator and a data word-shift register in such a manner that the data of the switching stage is inputted by means of the data word-shift register to a bus connected with a circuit module and the data of the circuit module is inputted by means of this bus and the status word generator connected therewith to the switching or reversing stage. Between one of the branches of the switching stage and the output of the status word generator there is incorporated a status word-shift register and between one of the other branches and the control logic circuit there is incorporated a command word-shift register.

BRIEF DESCRIPTION OF THE DRAWINGS

The invention will be better understood and objects other than those set forth above, will become apparent when consideration is given to the following detailed description thereof. Such description makes reference to the annexed drawings wherein:.

DETAILED DESCRIPTION OF THE PREFERRED EMBODIMENTS

Figure 1:
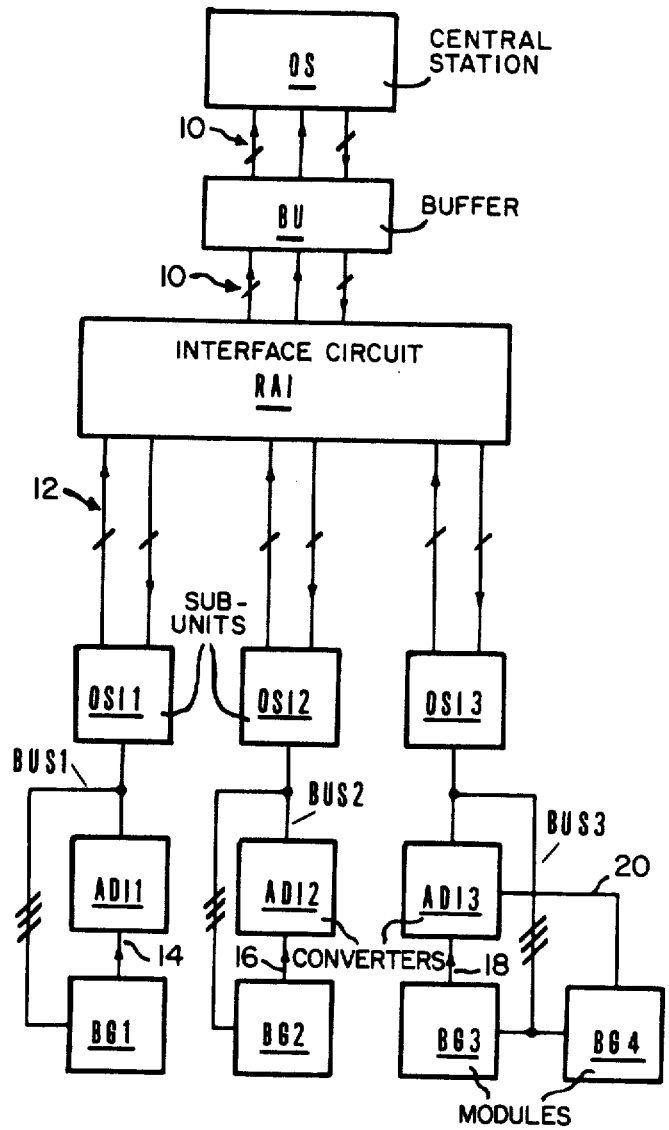
FIG. 1 is a block circuit diagram of a bus system constructed according to the present invention.

Describing now the drawings, the exemplary embodiment of bus system depicted in FIG. 1 will be seen to comprise an interface circuit RA1 connected by means of a bus-line 10 and a buffer BU with a central station OS. Connected with the interface circuit RA1, by means of further bus lines 12, is a respective sub-unit OS11, OS12 and OS13. These sub-units OS11, OS12 and OS13 are connected by means of a respective bus-bar or so-called bus BUS1, BUS2 and BUS3 with a converter AD11, AD12 and AD13 and a circuit module or sub-assembly BG1, BG2 and BG3, respectively, wherein the cirucuit module BG3 is connected by means of its related bus BUS3 with a further circuit module BG4. The circuit modules BG1 and BG2 are connected by means of a respective further connection or line 14 and 16 with the converter AD11 and AD12, respectively, and the circuit modules BG3 and BG4 are connected via the lines 18 and 20 with the converter AD13.

Figure 2:
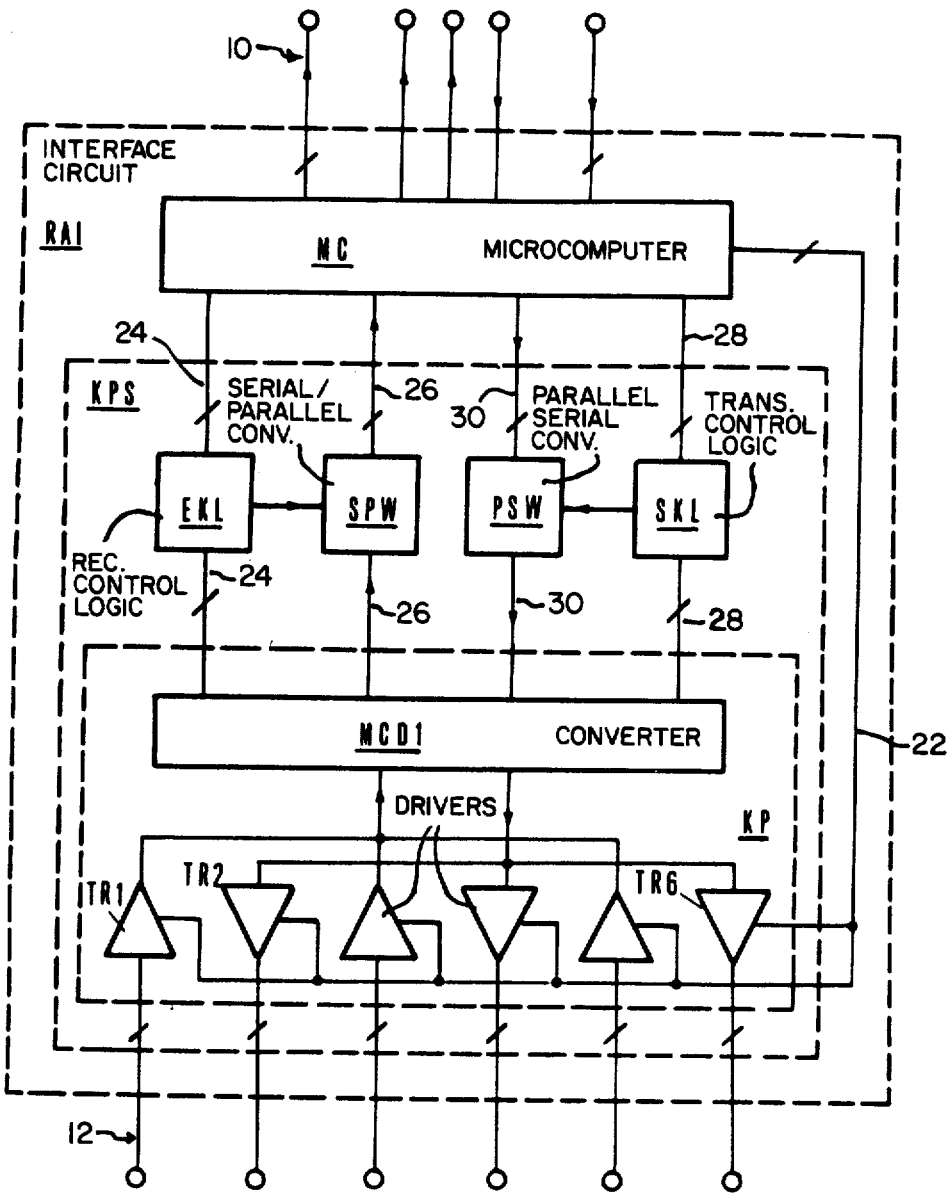
FIG. 2 is a block circuit diagram of the interface circuit of such bus system.

As best seen by referring to FIG. 2, the interface circuit RA1 shown therein will be seen to comprise a microcomputer MC connected by means of the bus-lines 10 with the buffer BU shown in FIG. 1, as well as a coupler sub-circuit KP connected by means of the further bus-lines 12 with the sub-units OS11, OS12, OS13 (FIG. 1). The coupler sub-circuit KP is provided with a Manchester converter MCD1 and with six drivers TR1, TR2, TR3, TR4, TR5 and TR6 which are individually controlled by the microcomputer MC by means of a bus-line 22. It is to be expressly understood, however, that there also could be provided more than six drivers.

The microcomputer MC is connected by means of bidirectional bus-lines 24 and a receiver control logic circuit EKL with the Manchester converter MCD1. The control logic circuit EKL controls a serial-parallel converter SPW which is connected by means of bus-lines 26 both with the microcomputer MC and also with the Manchester converter MCD1. Additionally, the microcomputer MC is connected with the aid of bidirectional bus-lines 28 by means of a transmitter control logic circuit SKL with the Manchester converter MCD1. The transmitter control logic circuit SKL controls a parallel-serial converter PSW which is connected by means of bus-lines 30 both with the microcomputer MC and also with the Manchester converter MCD1. The elements SPW, EKL, SKL, PSW and KP form a coupler circuit KPS.

Figure 3:
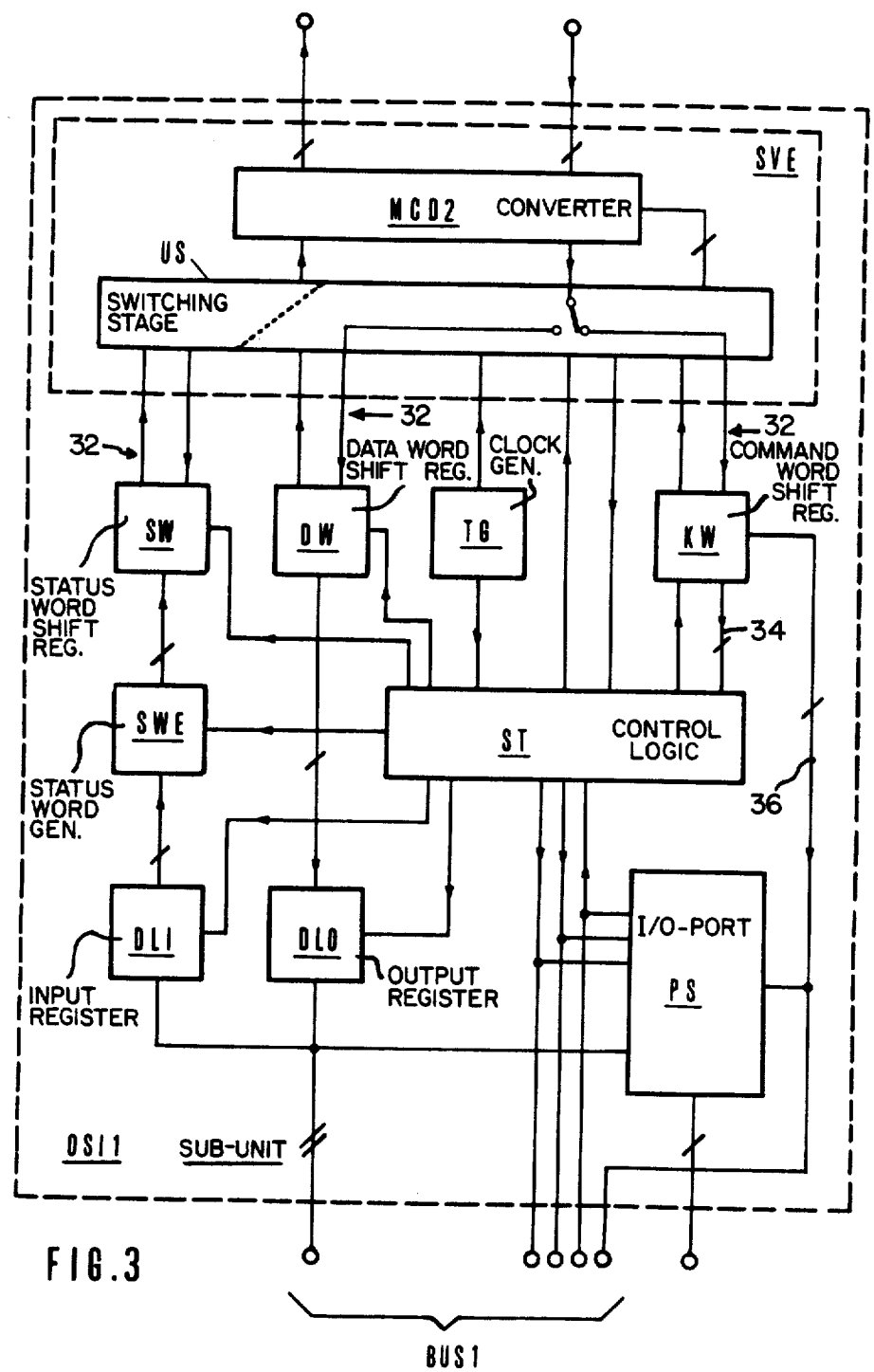
FIG. 3 is a block circuit diagram of a sub-unit of the bus system.

The sub-unit OS11 depicted in FIG. 3 will be seen to contain a signal processing device or signal processor SVE connected with a control logic circuit ST. This signal processing device SVE is equipped with a Manchester converter MCD2 and a switching or reversing stage US, which are connected in each case by means of a bus-line, generally indicated by reference character 32 on the one hand, with a shift register SW for status words, and, on the other hand, with a shift register DW for data words, and additionally, with a shift register KW for command words. A clock generator TG delivers the clock signals or pulses for the control logic circuit ST and for the switching stage US. The control logic circuit ST is connected, on the one hand, with the shift registers KW, DW and SW, and, on the other hand, with a status word generator SWE, an input register DL1, and an output register DL0. These registers contain three logical states, namely "1", "0" and "high-ohmic" or high-impedance. The registers are connected with one another by means of a bus-bar or bus and with an input-output circuit or port PS (I/O-port). This bus contains 6 address lines, 3 control lines and 8 bidirectional data lines. By means of this bus there are transmitted 8-bit wide dynamic data. Data is inputted from the input register DL1 by means of the status word generator SWE to the shift register SW and data is inputted from the shift register DW to the output register DL0. The shift register KW for command words is connected by means of a bus-line 34 with the control logic circuit ST and by means of a 6-bit address line 36 with the input-output port PS. This 6-bit address line 36 forms a further output of the sub-unit OS11. The control logic circuit ST and the input-output port PS are connected with one another by means of three control lines 38, namely a reading line, a writing line and a release or enable line. The input-output port or circuit PS possesses 48 inputs or outputs for the static bit data. The other sub-units OS12 and OS13 can be constructed like the sub-unit OS11.

The bus system depicted in FIGS. 1 to 3 functions in the following manner: the bus system transmits data from a central computer in the central station OS to the circuit modules or sub-assemblies BG1, BG2, BG3 and BG4 and vice versa. These circuit modules BG1, BG2, BG3 and BG4 are located at quite different places and at extremely different distances from the central station OS. The data transmission is accomplished in a serial and directionally separated fashion. The sub-units OS11, OS12 and OS13 are merely connected by a respective dual-wire line per direction with the interface circuit RA1.

There are present in the bus system three different types of interface circuits, namely the interface circuit RA1, the sub-units OS11, OS12 and OS13, and finally the converters AD11, AD12 and AD13.

The interface circuit RA1 forms the interface to the central computer and regulates the data traffic to the circuit modules. The sub-units OS11, OS12 and OS13 receive data from the interface circuit RA1 by means of the one related dual-wire line and make such available to the therewith associated circuit modules BG1, BG2, BG3 and BG4, respectively, as dynamic and static data. Conversely, the interface circuit RA1 recalls digital data by means of a sub-unit, this digital data being prepared by the sub-units, and transmits such by means of the other related dual-wire line to the interface circuit RA1. Analog data from a circuit module is received by the converters AD11, AD12 and AD13, respectively, converted into digital form and inputted to the sub-units OS11, OS12 and OS13, respectively. These converters are connected by means of dynamic interfaces with the therewith operatively associated sub-units.

The dynamic interface consists of 6 address lines, 3 control lines and 8 data lines, so that the data transmission is accomplished in accordance with principles which are conventional for microcomputers. The static data is always applied, in other words it is always available. Such is constituted by 48-bits which are either transmitted or received by a sub-unit OS11, OS12 and OS13, respectively. The transmission direction is determined by the interface circuit RA1 during the initializing phase at the relevant sub-unit OS11, OS12 and OS13, respectively. It is possible to define, for instance, 8-bit words as output or input information.

The interface circuit RA1 possesses an interface at which there is connected the buffer BU containing two buffer storages. By means of the one buffer storage data is received from the central station OS and by means of the other buffer storage data is received from the interface circuit RA1. The data exchange between the central station OS and the interface circuit RA1 therefore is accomplished directionally separate, and additionally, asynchronously. Each buffer storage has a capacity of 512 bytes.

At this point there will be considered the operation of the interface circuit RA1 of FIG. 2 which is as follows:

The microcomputer MC controls via the write line the transmitter storage and via the read line the receiver storage of the buffer BU (FIG. 1) and receives therefrom, by means of the release or enable line, a receipt or acknowledge signal which indicates which of both buffer storages is free or occupied. The actual data is transmitted by means of the 8-bit lines. The microcomputer MC, at the appropriate time, retrieves data out of the buffer BU (FIG. 1) and transmits such, in conjunction with a command word, to the parallel-serial converter PSW. As soon as a start signal is delivered from the microcomputer MC by means of the control logic circuit SKL to the converter PSW, the latter begins to transmit such data in serial fashion to the Manchester converter or encoder-decoder MCD1, which additionally delivers at its output a Manchester-coded synchronizing bit which indicates whether the following bits possess the character of data or command words. The command word not only contains addresses, but also information as to whether the interface circuit RA1 should transmit or receive data.

In the first instance the command word initially indicates the addresses and the command that data should be transmitted and then arrives, for instance, in the sub-unit OS11 (FIG. 3). This command functions in such a manner upon the control logic circuit SKL that the actual data is inputted by means of the parallel-serial converter PSW to the Manchester converter or encoder-decoder MCD1, which transmits the binary coded serial data, which is Manchester-coded, in each case by means of one of the drivers TR provided in the coupler sub-circuit KP to a sub-unit (FIG. 3) at a frequency of, for instance, 1.25 Mbit. The interface circuit RA1 itself forms a buffer where the data can wait, since the 8-bit data flow does not constitute any continuous data stream, rather is sporadically transmitted or retrieved by the microcomputer. Additionally, the correct outputs of the interface circuit RA1 are switched for the desired sub-units OS11, OS12 and OS13, respectively.

In the second operational mode when data should be received there is also delivered a command word which contains both an address and a control bit. This control bit provdes the command that data should be received. The data or information is deposited at the sub-unit in the form of a status word and transmitted back to the coupler circuit KPS, where the words are serial-parallel converted and inputted by means of the microcomputer MC to the buffer BU (FIG. 1). In contrast to the microcomputer MC the Manchester converter MCD1 does not possess any storage capacity.

The microcomputer MC analyses this status word and determines whether it contains error messages or data. An error message indicates, for instance, whether the parity-bit has been falsely placed or set, or whether the module is not active, i.e. does not have a potential applied thereto. In this instance it does not transmit any receipt or acknowledge signal, which is then interpreted as an error message or communication.

One problem which exists in a radar system is that the data can possess quite different rates, since some data can change very rapidly and other data extremely slowly. Therefore, it would be senseless to interrogate data which only changes every second at, for instance, a frequency of 1 kHz, because then there would be interrogated 1000 times the same data and at the same time there would be blocked the processing of other data.

It is for this reason that there is provided a regulation loop in the microcomputer MC, in order to frequently interrogate modules which deliver a rapid data flow, and to less frequently interrogate modules which deliver a slower data flow. This can be obtained at the microcomputer MC by appropriate programming thereof as is well known in the art.

The circuitry of FIG. 3 functions in the following manner:

The data arriving in one direction from the interface circuit RA1 (FIG. 1) is decoded in the Manchester converter MCD2 into a binary code and transmitted further to the command word-shift register KW, and specifically then when the command bit initially transmitted in the Manchester code indicates a command word. This shift register KW is controlled by the switching stage US and the command word delivered thereby is divided and a portion thereof is inputted both to an appropriate input of the input-output port PS and also to the address output of the sub-unit OS11 and another portion thereof is inputted to the control logic circuit ST. Moreover, the address of the sub-unit OS11 is compared with a hard-wired address.

The control logic circuit ST also checks the bit which indicates whether subsequent data is arriving, or whether the coupler or coupling circuit KPS should receive data from the circuit modules. If there has been indicated the presence of subsequent data, then the system waits until a Manchester-coded data stream arrives at the Manchester converter MCD2, which thereafter delivers a data word. The data stream is loaded into the data word-shift register DW which functions as a serial-parallel converter, and is further inputted in parallel to the output register DL0, where there appears the data for a certain time, during which time the control logic circuit ST transmits a write pulse to the modules which acknowledge the same, whereupon the control logic circuit ST controls the output register DL0 for transmitting the dynamic data by means of the bus. Thereafter, the write line is again set to "1" and there is produced a status word which is transmitted back as an indication of the correct transmission of the dynamic data to the coupler or coupling circuit KPS (FIG. 2). In the other direction the dynamic data is transmitted from the modules to the coupler circuit KPS. For this purpose the shift register KW receives a command word possessing a bit which indicates that data should be received from the module. Thereafter, the control logic circuit ST activates the read line to the circuit modules. As a result, the data of the circuit modules is delivered to the bus, which then arrives by means of the input register DL1 at the status word generator SWE, from which location such is conducted by means of the shift register SW activated by the control logic and operating as a parallel-serial converter and by means of the switching stage US to the Manchester converter or encoder-decoder MCD2, and thereafter such data is conducted to the interface circuit RA1 (FIG. 1).

The static data is transmitted or received, as the case may be, for instance in 8-bit blockwise fashion by means of the input-output port PS, which is controlled by the control logic circuit ST. The course of the static data in the one direction, that is to say, from the coupler circuit KPS operating as distributor to the modules, is accomplished in a manner such that initially there are transmitted address words from the coupler circuit KPS which arrive at the input-output port PS. Thereafter, data words again arrive from the coupler circuit KPS over the same path to the input-output port or circuit PS where they are deposited and maintained for such length of time until they are overwritten. The same holds true for the data flow in the other direction. Also in this case there are initially transmitted address words. The static data of the input-output port PS is read by the input register DL1 and transmitted in the same manner as the dynamic data back to the coupler circuit KPS. The 48-bits appearing at the output of the input-output port PS correspond to 6 bytes. With 3 of the 6 bits delivered by the shift register KW, which are present at one input of the input-output port or circuit PS, there is selected one of these 6 bytes. With the aforementioned 6 bits there can be produced 64 addresses, of which 6 are employed for the selection and 2 for the programming of the inputs-outputs. The input-output port PS possesses 6 inputs-outputs each containing a respective 8 bits, and the data arriving by means of the output register DL0 can be addressed either to the 8-bit input-output 1 or to one of the other 8-bit inputs-outputs 2 to 6.

The modules BG1, BG2, BG3, BG4 (FIG. 1) deliver digital data from different hardware circuits directly by means of the sub-units OS11, OS12 and OS13 to the central station OS and vice versa.

As to the static digital data such constitute condition signals which are taken over by the modules as individual bits. On the other hand, data which arrives 8-bit blockwise is dynamically processed, in order to save inputs, which otherwise would be needed because of the large number of bits. In FIG. 1 there have been randomly connected two circuit modules BG3 and BG4. It would be possible to also connect in circuit more circuit modules, because what is important are not the circuit modules themselves, rather the data which they deliver.

Figure 4:
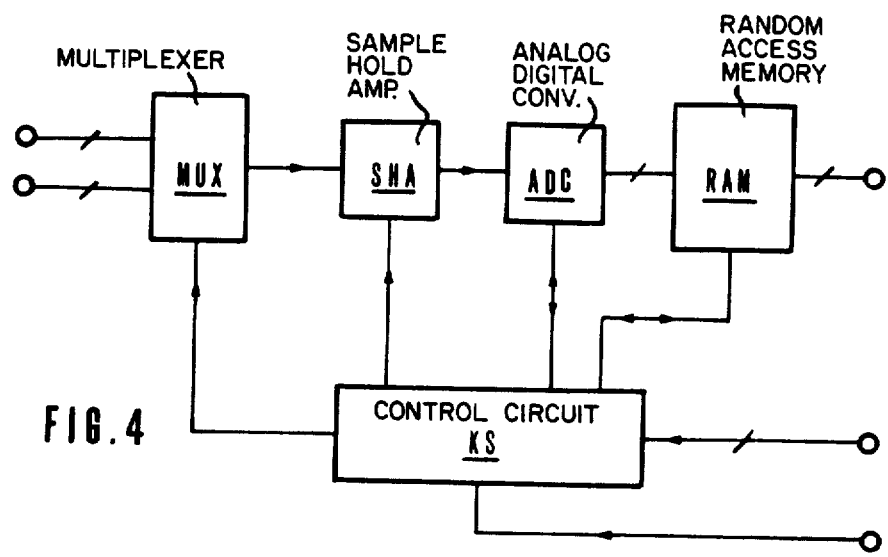
FIG. 4 is a block circuit diagram of a converter used therefor.
Figure 5:
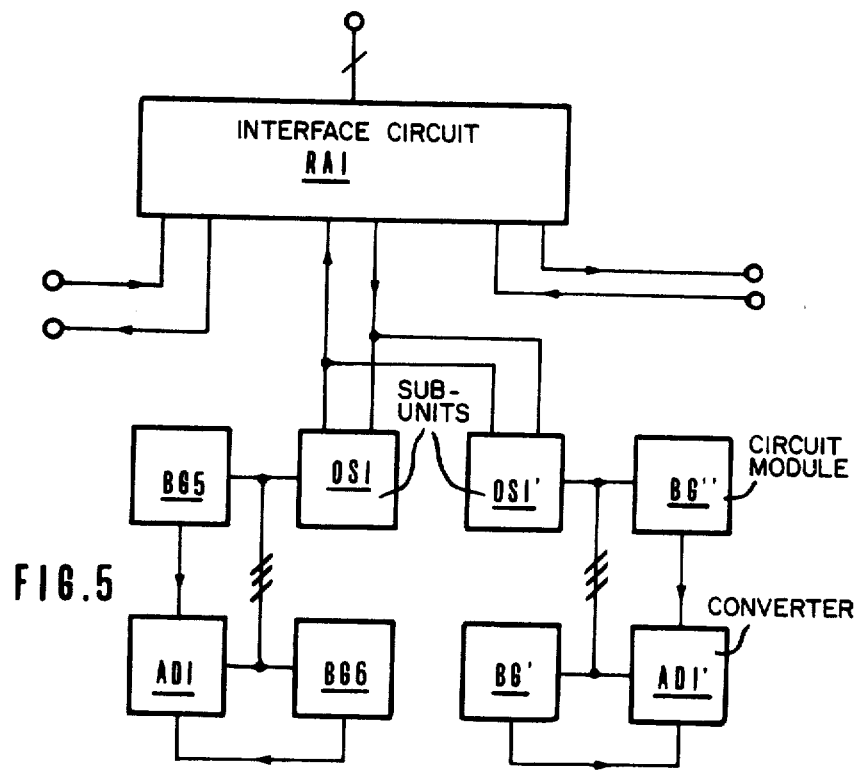
FIG. 5 is a detail showing of the circuitry of FIG. 1 but here containing an additional parallely connected sub-unit.

The converter of FIG. 4 is in principle an analog-to-digital converter which contains a multiplexer MUX, a sample-and-hold amplifier SHA, an analog-to-digital converter ADC, and a random access memory RAM, which are connected in series and controlled in each instance by a control circuit KS. The multiplexer MUX is provided with differential inputs for 8 channels and with simple inputs for 16 channels, and the random access memory RAM is provided with outputs for 8-bit data. Leading to the control circuit KS are, for instance, 6 address lines and 3 control lines as bus-lines as well as a further stop command line.

The converter of FIG. 4 is only necessary if the modules not only deliver digital data but also analog data. In this case the data initially must be converted into digital form. The control circuit KS is structured to contain a microprocessor. The random access memory RAM serves as a buffer in order to shorten the access time from the sub-unit. The analog data is first multiplexed in the multiplexer MUX, then coded by means of the sample-and-hold amplifier SHA and the analog-to-digital converter ADC, and then deposited in the random access memory RAM. The data can be retrieved much more rapidly from the random access memory RAM than if it had to initially be converted in each instance.

Also the Manchester converters MCD1 and MCD2 are not absolutely required for the operation of the bus system. It is namely possible to readily provide simple Manchester coders-decoders or coders-decoders of a different type, or, in fact, no coders-decoders. The advantage which is present with a Manchester coder-decoder is that the signals do not possess any direct-current voltage components. Additionally, there can be achieved a galvanic decoupling with the aid of a transmission device. Commercially available Manchester converters are usually equipped with an additional circuit which delivers a parity bit which can be used for supervision of the data traffic. To this end there is received a parity bit at the Manchester converter MCD2, which bit has been delivered by the Manchester converter MCD1, such parity bit is then checked by the Manchester converter MCD2 and further transmitted to the control logic circuit ST. This control logic circuit ST then delivers a feed-back signal to the status word generator SWE when the parity bit is false. The return feed line from the control logic circuit ST by means of the switching stage US to the Manchester converter MCD2 relates to the decoder or reconverter which reconverts the data arriving from the circuit modules. In this way there can be indicated that data is available, whereupon there is placed into operation the reconverter. As to the data arriving from the central station OS there is transmitted a report signal from the Manchester converter MCD2 to the control logic circuit ST in order to activate one of the shift registers DW or KW.

The registers DL1 and DL0 are not absolutely required if the status word generator SWE and the data word-shift register DW are constructed in such a manner that their inputs or outputs, as the case may be, also can possess a high-ohmic condition. The presence of the registers DL1 and DL0 however renders possible an automatic supervision of the circuitry. This is accomplished in the following manner: the data which has been transmitted at a certain address is retained in the output register DL0. The register transmits the data for a certain address to the bus as soon as this address is again read. After the reading-in of the data by means of the D-input of the register the data is sent back, whereafter the outputs are again in their high-ohmic state. Since the data which has been retained is again read there is provided a reproduction of the data which allows testing the same.

While there are shown and described present preferred embodiments of the invention, it is to be distinctly understood that the invention is not limited thereto, but may be otherwise variously embodied and practiced within the scope of the following claims. ACCORDINGLY,

I claim:

1. A bus system for the transfer of data between a central station and at least two circuit modules, comprising:
    an interface circuit connected with said central station and containing:
      a microcomputer for controlling data transfer via said interface circuit;
      signal transfer lines;
      a coupler circuit;
    said coupler circuit containing:
      a coupler sub-circuit for selecting said signal transfer lines;
      a parallel-serial converter;
      a serial-parallel converter;
    said parallel-serial converter effecting the transfer of data between said microcomputer and said coupler circuit in a first direction of transfer;
    said serial-parallel converter effecting the transfer of data between said microcomputer and said coupler circuit in a second, opposed direction of transfer;
    a plurality of sub-units connected with said interface circuit;
    each of said plurality of sub-units containing:
      a respective switching stage;
      control means for controlling said switching stage for determining the direction of transfer of the data;
    said coupler circuit being connected via said signal transfer lines with respective ones of the switching stages provided for said sub-units;
    a control logic circuit operatively connected with said switching stage of the corresponding sub-unit;
    a bus connected with said circuit modules;
    each sub-unit containing:
    a status-word generator for generating signals indicating a mode of operation; and
    a first shift register for data signals;
    said switching stage controlling via the control logic circuit said status-word generator and said first shift register in such a manner that the data present at the switching stage is delivered via said first shift register to said bus connected with the circuit modules and in such manner that the data present at the circuit modules is delivered via said bus and the status word generator connected therewith to the switching stage;
    each sub-unit further containing:
      a second shift register for said signals indicating the mode of operation; and
      a third shift register for signals controlling the mode of operation;
    said second shift register being incorporated between one branch of the switching stage and an output of the status-word generator; and
    said third shift register being incorporated between another branch of the switching stage and the control logic circuit.

2. The bus system as defined in claim 1, further including:
    a first encoder-decoder unit provided for the coupler circuit of the interface circuit and a second encoder-decoder unit provided for the switching stage of each sub-unit, in order to encode and decode, respectively, the data for each direction of transfer thereof.

3. The bus system as defined in claim 2, wherein: said coder-decoder units comprise Manchester converters.

4. The bus system as defined in claim 1, further including:
    an input-output port connected with the bus and provided for the corresponding sub-unit;
    said transfer of data which occurs in said second direction of transfer comprising both constant data not subject to change and variable data subject to rapid change; and
    the transfer of said constant data to and from the sub-unit occurring via said input-output port.

5. The bus system as defined in claim 1, further including:

a buffer containing a respective buffer store for both data flow directions incorporated between the central station and the microcomputer.

6. The bus system as defined in claim 1, further including:
an input register arranged between the bus and an input of the status-word generator; and
an output register incorporated between the bus and an output of the first register.

7. The bus system as defined in claim 1, further including:
a plurality of said coupler circuits with which the microcomputer is connected in said interface circuit.

8. The bus system as defined in claim 1, wherein:
at least two sub-units are conjointly connected via common signal lines with the interface circuit.

9. The bus system as defined in claim 1, wherein:
in at least one of said sub-units said signals indicating the mode of operation also include data and error signals.

10. The bus system as defined in claim 1, wherein:
an analog-to-digital converter is incorporated at least between a module and a sub-unit.

* * * * *